United States Patent Office 3,445,113
Patented May 20, 1969

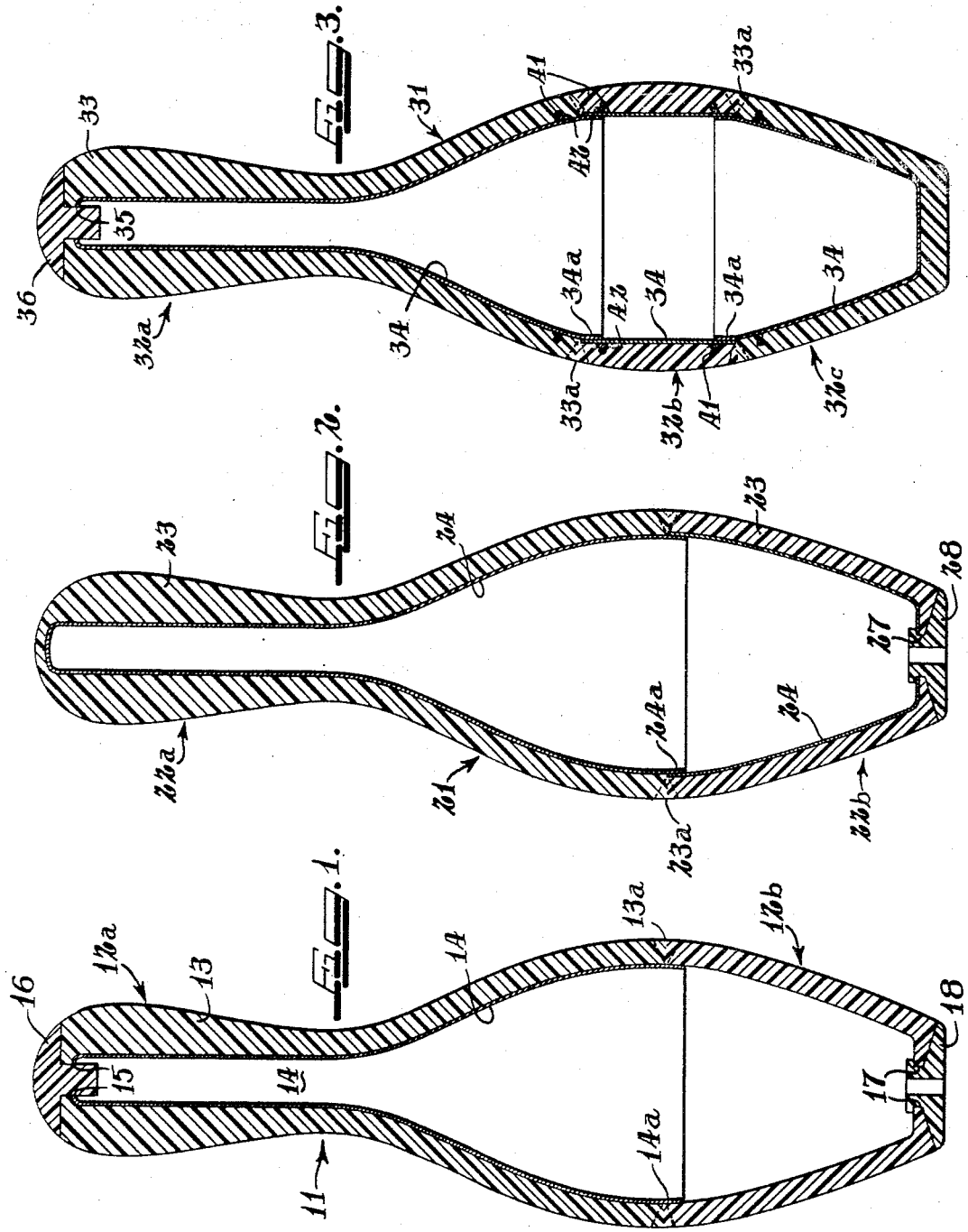

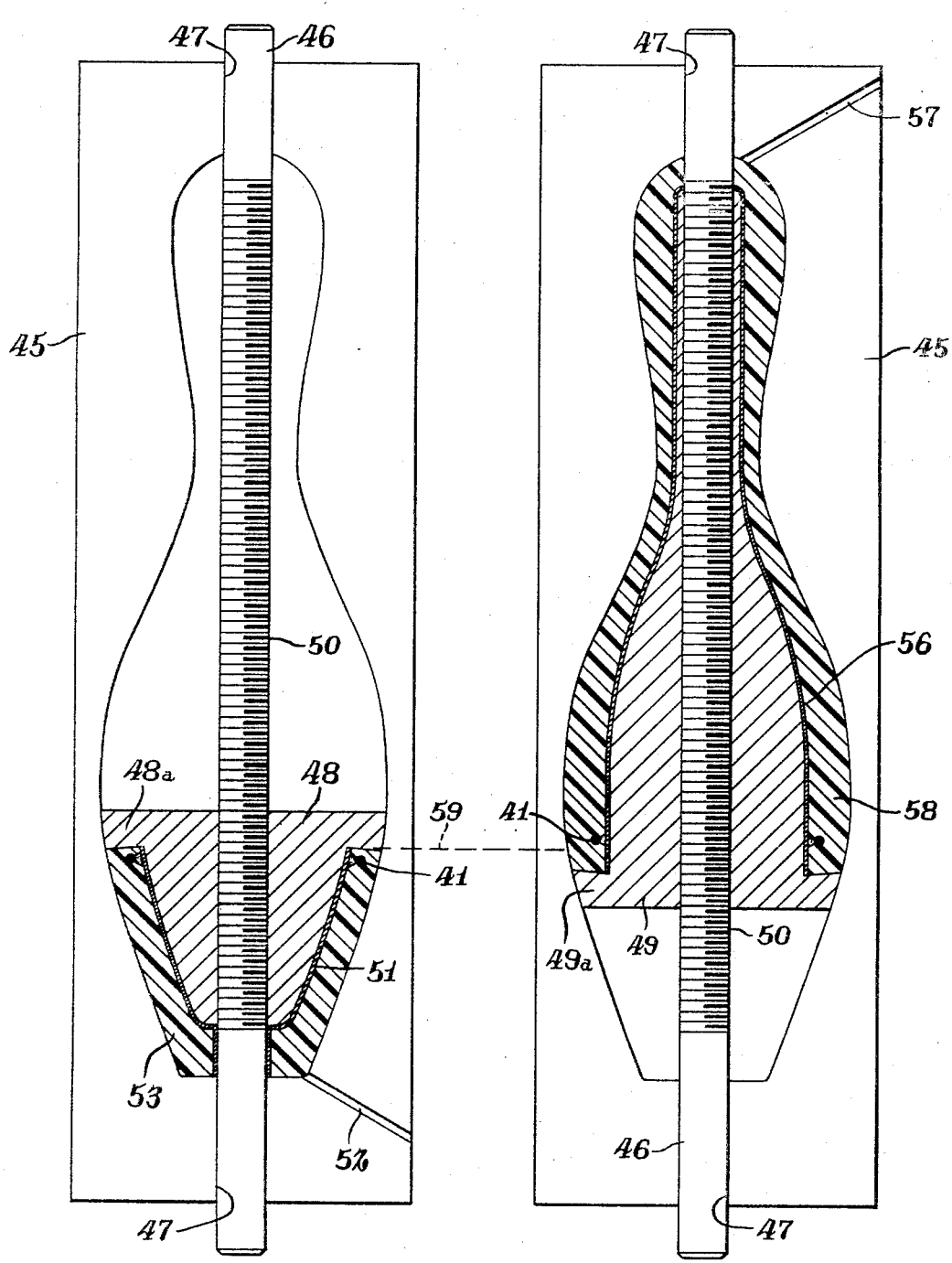

3,445,113
SECTIONAL BOWLING PIN WITH METAL LINER
AND OUTER PLASTIC SHELL
Fred E. Satchell, Grand Haven, and Robert M. Conklin and John J. Weisz, Muskegon, Mich., assignors to Brunswick Corporation, a corporation of Delaware
Filed Apr. 21, 1964, Ser. No. 361,526
Int. Cl. A63b 67/00
U.S. Cl. 273—82                                10 Claims

ABSTRACT OF THE DISCLOSURE

A rigid hollow plastic bowling pin formed of sections. Each section has a thick solid outer plastic shell and a thin lightweight metal liner. Each section is formed by injection molding a plastic over a liner which is fitted over a mandrel. The pin sections are joined end to end with the outer plastic shell sections being welded together to form the hollow bowling pin.

This invention relates to bowling pins and more particularly to rigid plastic bowling pins.

Much attention has been recently directed to the development of synthetic pins such as metal pins and plastic pins suitable for use in lieu of the more conventional wood or maple pins. Such development of synthetic pins has become, in recent years, more and more of interest in view of dwindling acceptable maple stocks for pin production and also in view of the economic advantages which may be obtained from the use of synthetic pins due to possible more economical manufacture.

It is important in a bowling pin to provide good impact strength and sound characteristics as well as proper weight and balance. While synthetic bowling pins can be fabricated entirely from thermoplastic materials via injection molding techniques, such pins have major deficiencies in neck strength, strength in the impact area of the belly and in sound. Use of a metal core in an otherwise plastic pin formed by injection molding of plastic over the metal core can overcome the strength and sound deficiencies; however, it is necessary to construct such cores in excessively thick and heavy dimensions in order to avoid collapse of the core during injection molding procedures. Such thick and heavy cores exceed permissive weight limitations and increase production costs such as to make their use unattractive and impractical.

It is a general object of this invention to provide a new and useful bowling pin of the character described and method for making the same.

It is also an object of this invention to provide new and useful bowling pin segments or portions formed by injection molding over partial cores fitted over mandrels for withstanding molding pressures.

Another object is the formation of bowling pin sections wherein a thin metal lightweight core may be used with the remainder of the pin or pin section being molded while supported on a mandrel backing the core internally thereof, the core being configurated for withdrawal from the mandrel.

Still another object is to provide a hollow bowling pin of sections predominately of plastic molded under pressure but having good impact strength and impact sound characteristics by virtue of the inclusion of a thin hollow structure internally of the plastic portion, which structure is sufficiently light in weight to permit good weight characteristics in the pin but is insufficient in itself in withstanding the molding pressure used for molding the plastic portion thereover, but over which structure the plastic may be pressure molded while backing the thin hollow structure with a mandrel, the thin hollow structure forming a core member in the predominately plastic pin.

A further object is to provide a pin according to any of the foregoing objects wherein the partial core or core member extends through the neck and/or belly region of the pin for improved neck and/or belly strength.

Still another object is to provide a bowling pin constructed of pin sections having plastic portions joined and internal metal liners extending to back the joints.

Other objects and advantages of this invention will be apparent to those in the art from the following description and from the drawings in which:

FIGURE 1 is a vertical section through a form of a pin in accordance herewith;

FIGURE 2 is a vertical section through another form of pin in accordance herewith;

FIGURE 3 is a vertical section of still another form of pin in accordance herewith;

FIGURE 4 is a vertical section through a mold for illustrating the molding of a pin portion;

FIGURE 5 is a vertical section through the mold as in FIGURE 4 illustrating molding of another pin portion.

Figure 6:
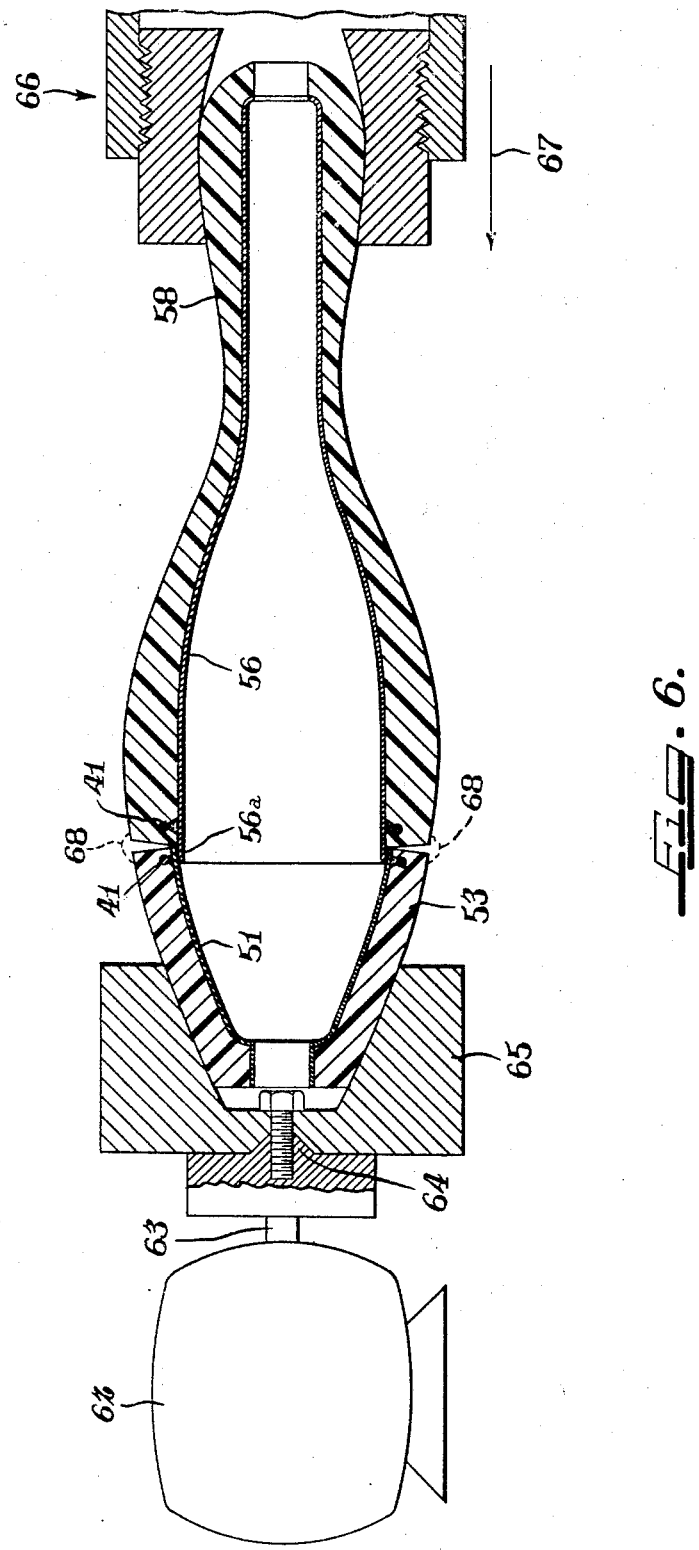
FIGURE 6 is a partially diagrammatic showing of equipment for use in spin welding for joining pin portions such as molded in the molds of FIGURES 4 and 5, with the pin portions shown in vertical section.

The following detailed description is given for clearness of understanding only and no unnecessary limitations are to be understood therefrom, as some modifications will be obvious to those skilled in the art.

In one embodiment, the present invention provides a hollow bowling pin which is predominantly plastic. The bowling pin includes a rigid hollow plastic body, preferably thermoplastic which has a thin structure, e.g. of metal, secured thereto interiorly. The exterior rigid plastic body includes at least one horizontal joint formed from a horizontal band of fused plastic, e.g. melted and reset thermoplastic, material which integrally joins adjacent portionss of the hollow plastic body. The interior structure is sufficiently thin to be collapsed by normal molding pressures for the plastic material of the plastic body. The structure terminates, or includes a joint, adjacent or at the joint of fused plastic material so that the juncture between two adjacent pin portions extends through the outer plastic body and the inner structure. The interiorly disposed structure functions as a liner on the inner surface of the plastic structural member and is configurated for withdrawal from a mandrel, e.g. by having an inner diameter along its length no greater than any inner diameter thereof closer to one open end of the liner such as an open end of the liner disposed adjacent the juncture.

Referring first to FIGURES 1–3, various pin forms are illustrated. The pins, indicated generally by reference numerals 11, 21 and 31, are formed from portions or segments indicated by reference numerals 12a and 12b, 22a and 22b, 32a, 32b and 32c. The pin and each of its segments has a plastic structural member or shell 13, 23 or 33. A thin metal liner, such as indicated by reference numerals 14, 24 and 34, is disposed within one or more of the pin segments. The plastic shells, where backed by liners, may be bonded thereto by adherence of plastic to the liner surface by injection molding at a fusion or melting temperature of the plastic and at elevated molding pressure. The liner preferably overlaps the next adjacent liner portion or the plastic structural member of the next adjacent pin segment and backs each joint between pin portions as indicated by reference numerals 14a, 24a and 34a. Where the liner overlaps the liner of the next adjacent section it provides a double liner thickness adjacent the joint. The joints between the plastic shells of the pin are illustrated in the form of plastic welds at 13a, 23a, and 33a, such as may be formed by fusing thermoplastic materials.

The pins of FIGURES 1 and 3 each include a top opening 15 or 35 which receives and has secured therein a plastic top plug or cap member 16 or 36. Each pin of FIGURES 1 and 2 includes a bottom opening 17 or 27 which receives and has secured therein a base member 18 or 28. In FIGURE 2 the pin top is closed by an integral extension of a thin layer of shell 23 and liner 24 thereover. In FIGURE 3, the pin bottom is enclosed by an integral extension of liner 34 and a thick layer of shell 33 to form the pin base.

The plastic structure is of a rigid plastic material, preferably thermoplastic, such as a high density linear ethylene copolymer. The liner members, which are present on the interior of one or more of the pin portions, are thin rigid materials of sheet thickness, e.g. metal of mere thin sheet thickness such as a thin mild low carbon steel material having a thickness of about .035″. The material may be produced as spun metal in the configuration of the liner by metal spinning fabrication methods well known in the art. Other useful lining materials will be evident to those in the art, including, by way of example, other steel alloys, aluminum, etc. Other plastic shell materials may also be used, as will be apparent to those in the art, e.g. acrylonitrile-butadiene styrene copolymer, high impact polystyrene, etc.

In a preferred form, the metal liner has secured thereto, adjacent the joint between adjacent pin portions and on either side of the joint, an annular outwardly projecting ridge member as illustrated in the form of an annular wire loop 41 which is secured to the liner by tack welds shown 42. The annular ridge 41 functions to retain the thermoplastic material adjacent the joint during formation of the joint by fusion bonding while the thermoplastic material is in its fluid state, as will be more apparent with respect to the description of a method of forming the pin hereinbelow.

The method of making bowling pins in accordance herewith generally includes the formation of separate transverse sections of the bowling pin and thereafter joining the sections at a generally horizontal or transverse joint. Accordingly, a plurality of pin sections or portions are formed by molding a body of plastic in a mold having a central mandrel member which is withdrawn upon completion of the molding operation. At least one of the pin sections includes a sheet metal sleeve or liner member supported by the mandrel during the molding operation. Where sections are molded to exclude the liner, the mandrel may be coated with a suitable release compound, e.g. wax. After forming the individual pin portions, the pin portions are joined together in vertical disposition with respect to each other to form a complete pin, such as may be accomplished with conventional spin weld techniques.

Turning now to FIGURES 4 and 5, there is illustrated a mold half 45 and a centering rod 46 centered within the mold cavity by means of bores 47. Although only one mold half 45 is illustrated in each figure, it is to be understood that two mirror-image halves are used for molding the pin and the two mold halves may be disposed face-to-face defining a mold cavity of bowling pin configuration with centering rod 46 centrally disposed in the cavity and held in position within bores 47. Suitable clamps or other means (not shown) may be used to hold the mold halves together against injection molding pressures.

FIGURE 4 illustrates the mold adapted for molding a lower portion of the bowling pin and in FIGURE 5 the mold is adapted for molding an upper pin portion. Accordingly, a mandrel 48 is secured, i.e., threaded, on rod 46 within the mold cavity. As is seen in FIGURE 5, another mandrel 49 is threaded to a centering rod 46. The two mandrels are interchangeable on rod 46 for disposing either within the mold. Male threads such as illustrated at 50 are provided on rod 46 for cooperation with female threads through either mandrel 48 or 49 for adjustment of axial disposition of the mandrels on the centering rod.

In order to mold a lower pin portion, a bottom spun mild steel liner member 51 of generally cup-like configuration is placed on mandrel 48, conforming to the outer surface of mandrel 48. The mandrel and centering rod 46 are positioned with centering rod 46 being secured against axial movement within bores 47. Suitable packing may be used between rod 46 and bores 47 as desired to prevent leakage from the mold during molding operation. Mandrel 48 is then axially adjusted downward as viewed in FIGURE 4 via threads 50 until the annular ridge 48a of mandrel 48 is placed into sealing contact with the inner wall of the mold. The mold halves are then closed and clamped to seal them along their closure and thermoplastic material in the form of a molding compound is injected by a plastic injection molding machine through the inlet sprue 52, e.g. in one mold half or at the mold closure, to fill the cavity with plastic material indicated by reference numeral 53. The plastic material is then permitted to set, mold 45 is unclamped and opened, rod 46 and mandrel 48 removed, and mandrel 48 is withdrawn from member 51, plastic material 53 being bonded to member 51 and being removed therewith.

Referring to FIGURE 5, it will be apparent that the upper portion of the pin can be formed in the same manner. Accordingly, spun mild steel liner 56 is placed over mandrel 49 and mandrel 49 and rod 46 are assembled and inserted in the mold. The axial disposition of mandrel 49 on rod 46 is adjusted via threads 50 in a downward direction as illustrated in FIGURE 5, until flange 49a sealingly engages the inner walls of the mold cavity. The mold is closed and clamped and the plastic material is injected through inlet sprue 57, set, and the mold is then opened for removal of the assembly of plastic shell 58 bonded to the liner 56. Mandrel 49 is withdrawn. Similar mandrels can be provided as will be evident for molding the structure in three or more segments including a liner in one or more segments as desired.

It will be noted by comparison of FIGURES 4 and 5 that the upper limit of the liner 51 and plastic material 53 is at the horizontal dotted line 59 while the lower limit of plastic material 58 and liner 56 extends below line 59.

Although, as shown in FIGURES 4 and 5, the assemblies of mandrels 48 or 49 and rod 46 are supported at both ends in bores 47, where it is desired to produce an integrally enclosed pin top as in FIGURE 2, or pin bottom as in FIGURE 3, it is understood that a mandrel of suitable configuration will be supported from only one end and the opposing bore 47 will be omitted.

Referring now to FIGURE 6, there is provided apparatus for carrying out a spin welding procedure for joining rigid plastic member 53 to rigid plastic member 58 to form a complete bowling pin shell. Accordingly, a motor 62 is provided for driving shaft 63 which has secured thereto, for rotation therewith, e.g. at 190 r.p.m., a wheel 64. Bolted to wheel 64 is a rotating fixture in the form of a rubber cup 65 which is configurated to receive plastic portion 53. To the right in FIGURE 6 there is illustrated a chuck assembly 66 of conventional design for use in spin welding procedures. Chuck assembly 66 is adapted to grip the head portion of plastic member 58 and hold member 58 against rotation for a predetermined period of time; thereafter a brake holding chuck 66 is released, permitting member 58 to rotate with member 53 by frictional engagement therewith.

The material from the lower end of plastic member 58 is trimmed below line 59 at an angle of 5° from horizontal, inclined upward and away from member 56, leaving an average excess of .030″ of material below line 59 for formation of a circumferential bubble of plastic material during spin weld joining of sections 53 and 58, as will be better described hereinbelow; the bubble formed from this plastic material will solidify to solid plastic and may be removed by shaping. The trimming below line 59 leaves a projection 56a of the liner 56 beyond the plastic material at the end to be joined to an adjacent pin section, which functions as a guide for proper alignment of the two adjacent sections preparatory to spin welding.

In operation of the spin welding apparatus, the pin sections are placed in the apparatus with projection or lip 56a guiding within the next adjacent liner 56, and pressure is applied to fixture 66 in the direction indicated by arrow 67; member 58 is held against rotating while member 53 is rotated. The pressure applied to the left through fixture 66 engages and abuts the end surfaces of members 53 and 58 still guided by lip 56a, the friction between the abutting surfaces producing sufficient heat to melt the thermoplastic material of members 53 and 58 at and adjacent their abutment. The molten thermoplastic material is held against flowing substantially away from the abutment by annular ridges 41 and the molten material flows into a bubble or welt in a form such as that illustrated by dotted outline 68 in FIGURE 6. The brake on chuck assembly 66 is released and member 58, via frictional engagement with member 53, is caused to rotate along with member 53 at the same rotational rate while pressure is applied along line 67 to join the two pieces. After solidification of the material at 68, e.g. 20 seconds, the lathe-like apparatus is stopped and the resulting joined assembly is then removed from the spin weld apparatus. After removal of the pin shell from the spin welding apparatus the shell may be turned on a lathe to remove any excess bonding material between pin portions, e.g. at 68, and generally trim the pin as desired. A top plug may be assembled in the top opening of the pin and the bottom may be shaped to receive a base member such as illustratred in FIGURES 1–3.

As indicated, the spin weld apparatus is conventional and is well known in the art. The plastic injection molding machine is also conventional and a suitable machine is, for example, a Hydraulic Press Manufacturing Company (Mt. Gilead, Ohio) machine having a 16½″ injection ram with an 18″ stroke and 2500 p.s.i. maximum pressure and 80 oz. injection capacity. The injection in the example above illustrating the formation of the pins was carried out by injecting the ethylene co-polymer under a pressure of 15,000 to 20,000 p.s.i. during molding cycle time of 20 seconds, injection followed by 2 minutes cooling to set the plastic. For the particular copolymer used, the copolymer was at a temperature in the range of 375° to 500° F. during injection; satisfactory results were obtained, for example, at about 400° F.

The mold cavity was maintained at a temperature in the range of 100° F. to 200° F. by use of cooling water during the injection phase of each molding run. The ethylene copolymer which was used had a Shore D hardness of 70 at room temperature.

We claim:
1. A bowling pin comprising a plurality of transverse pin sections each having an open end and each comprising a rigid structural thermoplastic thick shell member backed with a separate substantially thinner metal liner bonded to the interior of the rigid thermoplastic member, one of said liners comprising a cylindrical upper portion having generally constant diameter for backing one thermoplastic member in the neck region of the pin and an internal lower flared skirt portion for backing the shoulder region of the pin, said one liner having no larger inner diameter in said cylindrical portion than at the transition thereof into said lower flared portion, another of said liners comprising a base portion and a flared portion extending upwardly and outwardly therefrom backing another thermoplastic member in the base region of the pin, means securing said plurality of sections in generally vertical alignment and in bowling pin configuration consisting essentially of a thermoplastic weld, said liners of adjacent sec- overlapping at and backing said plastic weld, whereby said bowling pin includes an outer rigid plastic shell as a structural member backed by an inner thin liner structure with said plastic weld and the overlap of said liners constituting transverse joint means extending through the plastic pin structure and the inner liner structure, said liners being of sufficient thinness to collapse in the absence of said rigid plastic and under an exterior pressure on the order of molding pressures for molding said thermoplastic members in situ on each of said thin metal liners per se.

2. The bowling pin of claim 1 including annular circumscribing rib means secured to the exterior of each of said liners adjacent said joint means and projecting into the thermoplastic material of said plastic members.

3. The bowling pin of claim 1 wherein said plurality of pin sections includes a separate third pin section comprising a generally cylindrical thin metal liner bonded to and backing a third thermoplastic member in the belly region of the pin.

4. A hollow bowling pin comprising a thick, solid, rigid, structural, hollow, outer plastic shell comprising a plurality of vertically disposed portions, a substantially thinner metal liner adhered by the shell plastic material to the inner surface of at least one portion of the shell for supporting said liner under impact, said one shell portion having its largest inner diameter at an end thereof, said liner extending from said one shell portion at said end thereof as a circular band, said shell including joining means joining said shell portions and consisting essentially of a horizontal rigid plastic weld.

5. The pin of claim 4 wherein said weld is disposed a sufficient vertical distance from the plane of ball impact points so as not to receive direct major impact forces during bowling.

6. The bowling pin of claim 4 wherein said thin metal liner includes a cylindrical portion of generally constant diameter extending through the neck and into the head portion of the bowling pin.

7. The bowling pin of claim 4 including a second liner secured to the inner surface of an adjacent portion of said shell, said circular band overlapping the end of said second liner and providing double liner thickness at the overlap completely around the first liner circumference.

8. The pin of claim 7 wherein the weld secures the liners together at the circular band.

9. The bowling pin of claim 4 wherein said liner includes annular outwardly projecting rib means projecting into said shell adjacent said weld.

10. The bowling pin of claim 4 wherein said liner has a generally uniform thickness of about .035 inch.

References Cited
UNITED STATES PATENTS

| | | |
|---|---|---|
| 1,519,835 | 12/1924 | Hedenskoog. |
| 1,585,857 | 5/1926 | Hedenskoog. |
| 2,166,950 | 7/1939 | German et al. |
| 3,025,061 | 3/1962 | Ernst et al. _____ 273—82 |
| 3,169,766 | 2/1965 | Ernst _____ 273—82 |
| 3,201,124 | 8/1965 | Halip. |
| 3,224,769 | 12/1965 | Nickell. |
| 3,228,687 | 1/1966 | Bauer. |
| 3,232,614 | 2/1966 | Abbat. |
| 2,027,962 | 1/1936 | Carrie. |

RICHARD C. PINKHAM, Primary Examiner.

R. W. DIAZ, JR., Assistant Examiner.

U.S. Cl. X.R.

156—306; 264—68, 278